(12) United States Patent
Wilson et al.

(10) Patent No.: US 9,799,071 B1
(45) Date of Patent: Oct. 24, 2017

(54) ONE SWIPE REGISTRATION

(71) Applicant: Square, Inc., San Francisco, CA (US)

(72) Inventors: Jesse Wilson, Waterloo (CA); Brian Grassadonia, San Francisco, CA (US); Matthew Rhodes, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 0 days.

(21) Appl. No.: 14/284,227

(22) Filed: May 21, 2014

(51) Int. Cl.
*G06Q 40/02* (2012.01)
*G06Q 20/40* (2012.01)
*G06Q 20/10* (2012.01)

(52) U.S. Cl.
CPC .......... *G06Q 40/02* (2013.01); *G06Q 20/10* (2013.01); *G06Q 20/4018* (2013.01)

(58) Field of Classification Search
CPC .... G06C 20/204; G06C 20/20; G06C 20/202; G06C 20/40; G06C 20/10
USPC .......................................................... 705/17
See application file for complete search history.

(56) References Cited

U.S. PATENT DOCUMENTS

| | | | | |
|---|---|---|---|---|
| 2011/0251892 | A1* | 10/2011 | Laracey | G06Q 30/0253 705/14.51 |
| 2013/0110656 | A1* | 5/2013 | Chau | G06Q 20/204 705/17 |
| 2013/0290234 | A1* | 10/2013 | Harris et al. | 706/46 |

* cited by examiner

*Primary Examiner* — Garcia Ade
(74) *Attorney, Agent, or Firm* — Eric L. Sophir; Dentons US LLP

(57) ABSTRACT

Disclosed are system and methods for registering an account with a payment service system on behalf of a customer in response to a payment card associated with the customer being used at a point of sale terminal. The system receives payment card information extracted from the payment card when it is swiped at the point of sale terminal. The system also receives a communication identifier that is entered on a user interface of the point of sale terminal or on a user interface of a mobile application on a mobile device of the customer. In response to receiving the payment card information and the communication identifier, the system automatically creates an account for the customer by associating the payment card with the communication identifier without requiring the user to enter details of the payment card to link the payment card to the account.

19 Claims, 12 Drawing Sheets

420

| Customer ID1 | Customer ID2 | First Name | Last Name |
|---|---|---|---|
| Johndoe@gmail.com | 503-727-1000 | John | Doe |
| Janedoe@gmail.com | 860-828-8001 | Jane | Doe |
| Sally@gmail.com | 203-764-2980 | Sally | Smith |
| Jimmy@gmail.com | 203-764-2980 | Jim | Cole |

425

| Customer ID1 | Payment Card Number | Issuer | Expiration | Billing Address | Verification Status |
|---|---|---|---|---|---|
| Johndoe@gmail.com | XXXX-XXXX-XXXX-XXXX | Bank of America | 1/31/2016 | 654 ABC st, New York, NY 10086 | Unverified |
| Janedoe@gmail.com | XXXX-XXXX-XXXX-XXXX | Wells Fargo | 5/31/2017 | 100 PQ st, Seattle, WA 98101 | Verified |
| Sally@gmail.com | XXXX-XXXX-XXXX-XXXX | Chase | 6/1/2015 | 30 Rock st, New York, NY 10012 | Verified |
| Jimmy@gmail.com | XXXX-XXXX-XXXX-XXXX | PNC | 1/31/2013 | 100 ABC st, Palo Alto, CA 94022 | Inactive |
| Johndoe@gmail.com | XXXX-XXXX-XXXX-XXXX | Wells Fargo | 1/31/2016 | 654 ABC st, New York, NY 10086 | Verified |

*FIG. 4B*

ONE SWIPE REGISTRATION

BACKGROUND

Customers can use various payment services or applications to pay other customers, merchants or service providers. Typically, existing payment services require customers to sign up or register for an account by providing personal information and setting up a username and password in order to use the service. However, the existing method of account creation places much of the burden on the customers, thereby discouraging the customers from using the payment services.

BRIEF DESCRIPTION OF THE DRAWINGS

One or more embodiments of the present disclosure are illustrated, by way of example and not limitation, in the figures of the accompanying drawings in which like references indicate similar elements.

FIG. 4B illustrates an example of database tables coupled to the one swipe registration system in accordance with some embodiments of the one swipe registration technology.

DETAILED DESCRIPTION

Figure 1:
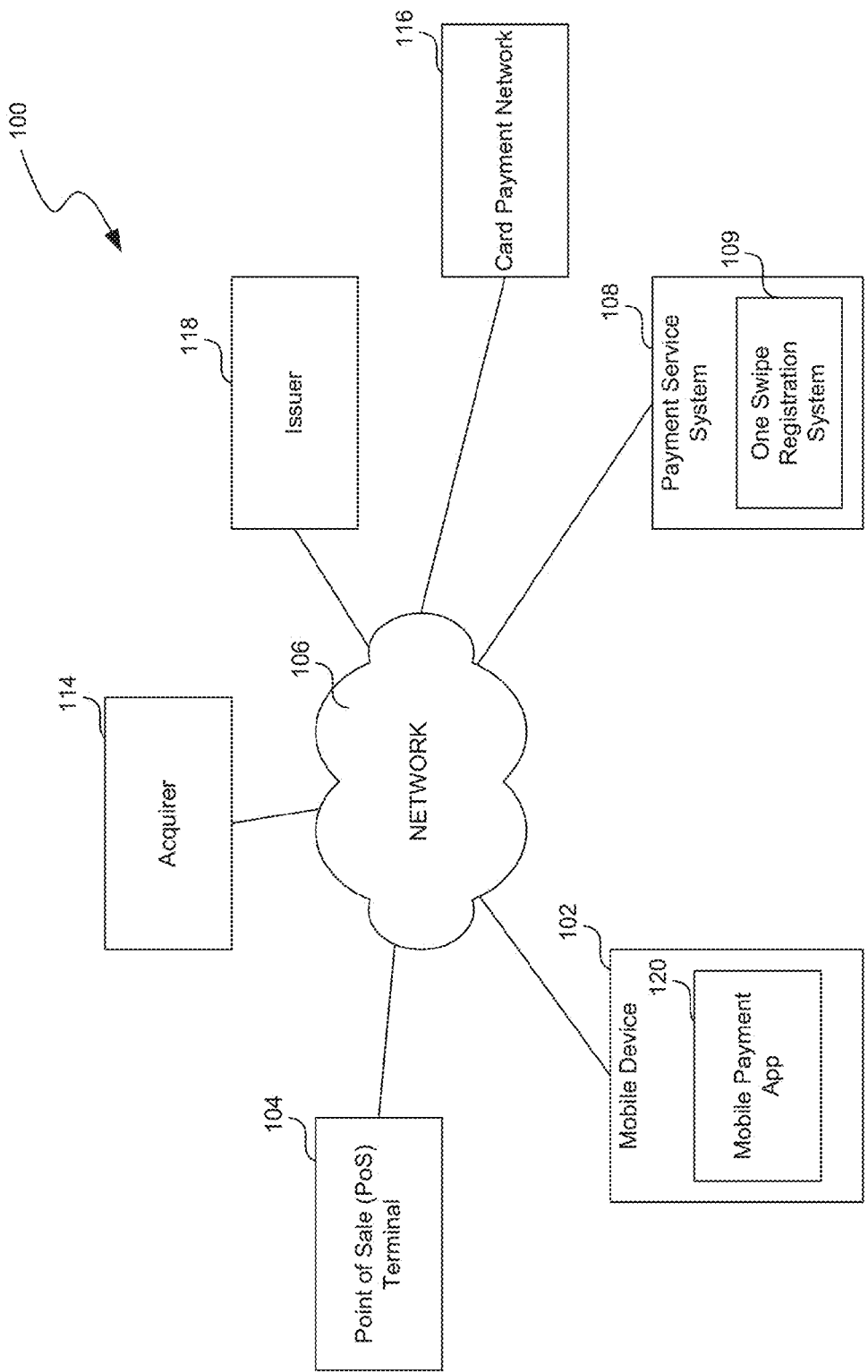
FIG. 1 illustrates an environment in which a one swipe registration technology can be implemented.

The present disclosure is related to a system and method of implementing one swipe registration (hereinafter "one swipe registration technology") by a payment service system. The one swipe registration technology enables registration or creation of an account on behalf of a customer in response to initiation of a transaction using a payment card such as a debit card or a credit card at a point of sale terminal and entry of an email address or a phone number. A transaction can be initiated at the POS terminal when information associated with a payment card is captured by the POS terminal. The information associated with a payment card can be captured by the POS terminal or provided to the POS terminal in various ways. For example, a payment card can be swiped through, tapped on, brought in close proximity to or inserted into a card reader. Different types of cards can require different types of card readers to read the payment card data. Information associated with a payment card can also be manually input into the POS terminal using a keyboard or pinpad device. In some instances, information associated with a payment card can be obtained from an image of a payment card captured using a scanner or a camera. As used herein, a "swipe" includes any of the above methods of capturing information associated with a payment card at a POS terminal. As used herein, a "swiping transaction" includes any transaction initiated at a POS terminal using a payment card.

The one swipe registration technology uses information captured at the POS terminal and the email address or phone number provided by the customer via a user interface associated with the POS terminal or the customer's mobile device to automatically register the customer account. The information captured at the POS terminal during a swiping transaction can include payment card information such as payment card identifier, expiration date, card verification value (e.g., CVV, CVV1, CVV2), billing address or zip code, or the like. The email address or phone number can be provided by the customer for the purpose of receipt delivery or as part of any user interaction with the POS terminal (e.g., to sign up for promotions or offers).

When the one swipe registration technology registers the customer account, the technology establishes a temporary association between the payment card and the email address or phone number. The association can remain temporary until a verification of the email address or phone number can occur. Thus, the customer account that is registered on the customer's behalf can be initially assigned an unverified status. In some embodiments, an unverified customer account can be partially authorized for use by the customer to engage in services provided by the payment service system. For example, the payment service system can authorize the account to allow funds sent by another customer to the email address or phone number of the customer to be deposited into a bank account associated with the payment card, even if the association between the payment card and the email address or phone number has not been verified. On the other hand, withdrawal of funds from the bank account associated with the payment card using the email address or phone number is not allowed until the association between the payment card and the email address or phone number has been verified.

In some embodiments, following registration of the customer account, the one swipe registration technology can send a verification request to the customer's email address or phone number. The verification request can include a link that the customer can select to launch an application installed on the mobile device or a webpage on a browser and prompt the customer to enter the card verification value for the payment card. If the card verification value that is entered by the customer is verified to be a match (e.g., by an entity such as a payment processor, issuer, etc.), the one swipe registration technology verifies the customer as the owner of the payment card and the email address or phone number, and thus, the authorized owner of the customer account. The one swipe registration technology can then change the status of the customer account from unverified to verified.

In some embodiments, the registration verification can be triggered from the customer side when the customer sends a transaction request using the email address or phone number to the payment service system. In response to the transaction request, the one swipe registration technology can request the customer to provide the card verification value for the payment card. If the card verification value entered by the customer is verified to be a match, the one swipe registration technology verifies the customer account as the owner of the payment card and the email address or phone number, and thus, the authorized owner of the customer account. The payment service system then processes the transaction request.

As described above, the payment service system (and any other services that utilize the one swipe registration) simplifies the account registration process for customers by removing the friction of registering for an account, creating or entering a username and password, manually entering payment card information, and the like. Since the one swipe registration technology captures payment card information during the swiping action, this reduces the burden on the customer because the customer can provide minimal information such as an email address or phone number and a card verification value of the payment card and allow the one swipe registration technology to automatically link the payment cards to the email address or phone number. Besides simplifying the registration process, the one swipe registration technology allows customers to engage in transactions using an email address or phone number and a card verification value of a payment card.

Various embodiments and implementations of the disclosed one swipe registration technology will now be described. The following description provides specific details for a thorough understanding and an enabling description of these implementations. One skilled in the art will understand, however, that the disclosed system and methods may be practiced without many of these details. Additionally, some well-known structures or functions may not be shown or described in detail, so as to avoid unnecessarily obscuring the relevant description of the various implementations. The terminology used in the description presented below is intended to be interpreted in its broadest reasonable manner, even though it is being used in conjunction with a detailed description of certain specific implementations of the disclosed system and methods.

FIG. 1 illustrates an environment 100 in which the one swipe registration technology can operate. The environment includes a merchant point of sale terminal 104 of a merchant and a mobile device 102 of a customer. The mobile device 102 can be, for example, a smart phone, a tablet computer, a phablet, a notebook computer, or any other form of mobile processing device. In some embodiments, a mobile payment application 120 runs on the customer's mobile device 102. The environment 100 can also include a computer system of the merchant's acquirer (hereinafter "acquirer 114"), a computer system of an issuing bank (hereinafter "issuer 118"), a computer system of a card payment network (hereinafter "card payment network 116"), and a computer system of a payment service (hereinafter "payment service system 108") implementing one swipe registration system 109. Each of the aforementioned computer systems can include one or more distinct physical computers and/or other processing devices which, in the case of multiple devices, can be connected to each other through one or more wired and/or wireless networks. All of the aforementioned devices are coupled to each other through an internetwork 106, which can be, or include, the Internet and one or more wireless networks (e.g., a Wi-Fi network and/or a cellular telecommunications network).

The environment 100, illustrated in FIG. 1, can accommodate transactions involving payment cards such as debit cards, credit cards, pre-paid cards, bank accounts, mobile payment applications and the like. The mobile payment application 120 can include an electronic wallet application, money transfer application (e.g., application for sending and receiving money via email or phone), or any other application having an account that is linked to one or more payment cards and/or bank accounts and can be used by the owner of the mobile device to initiate transactions. Such transactions can include traditional purchase transactions between customers and merchants or service providers, person to person transactions and the like.

In a traditional payment card (e.g., debit or credit card) transaction, the merchant swipes the customer's credit card through a card reader at the POS terminal 104. The POS terminal 104 sends an authorization request includes data read from the card (e.g., the cardholders name, credit card number, expiration date and card verification value (CVV)) to the payment service system 108, which, in turn, routes the authorization request to the acquirer 114. The acquirer 114 sends this data to the the card payment network 116 (e.g., Visa, MasterCard), which forwards the data to the issuer 118 for authorization. If the transaction is approved or authorized by the issuer 118, a payment authorization message is sent from the issuer 118 to the merchant POS terminal 104 via a path opposite of that described above. Once the transaction is authorized, settlement and clearing occurs. During settlement and clearing, the issuer 118 sends the funds associated with the authorized transaction through the card payment network 116 to the acquirer 114 to be deposited in the merchant's account with the acquirer 114.

Figure 2:
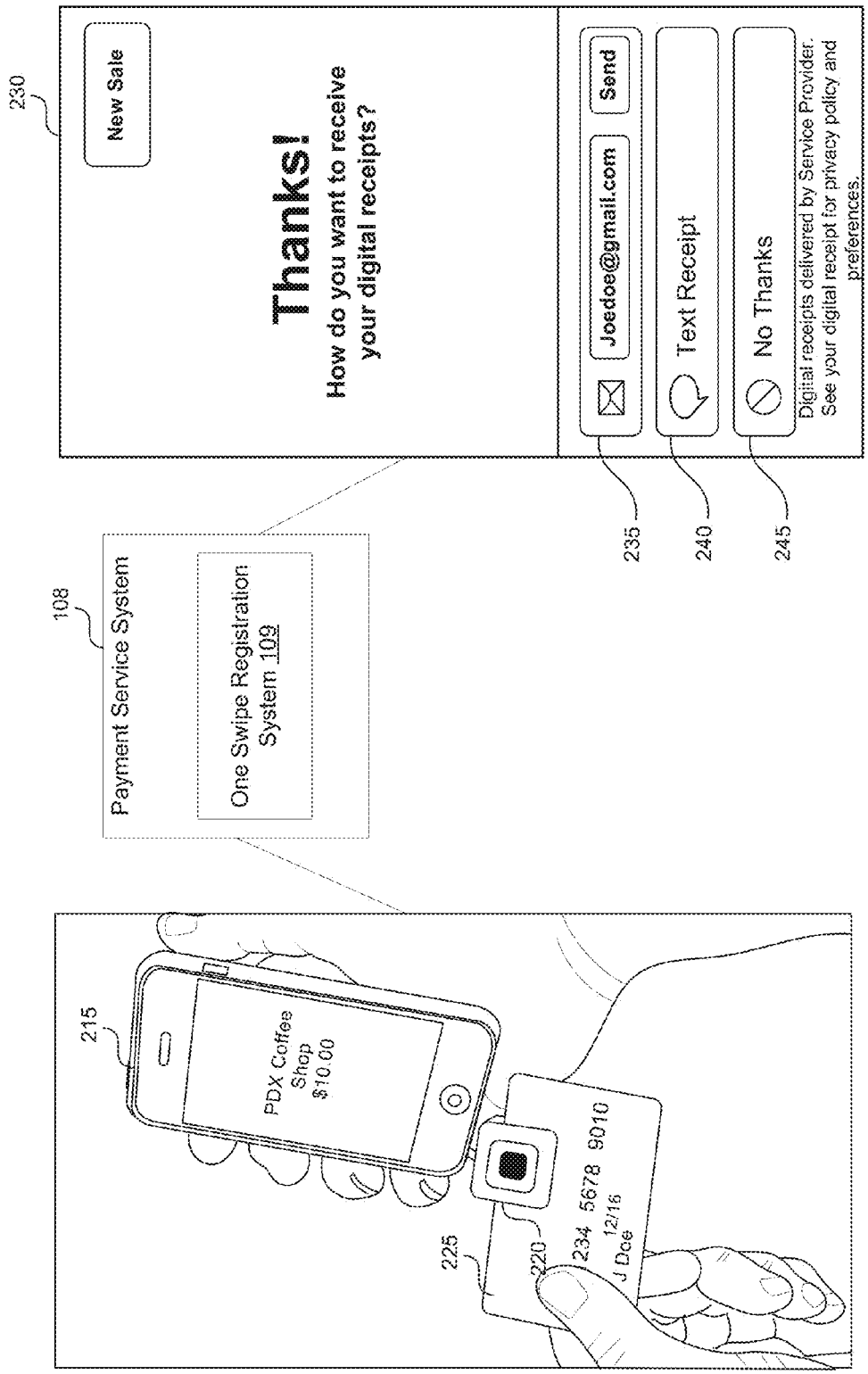
FIG. 2 illustrates automatic registration of a customer account, in accordance with some embodiments of the one swipe registration technology.

FIG. 2 illustrates registration of an account on behalf of a customer triggered by a swipe of the customer's payment card at a POS terminal 215 to complete a purchase transaction in some embodiments of the one swipe registration technology. The POS terminal 215 can be a mobile device with a card reader 220 and a POS application installed on the device to take payments. The card reader 220 can read data on the magnetic stripe of the payment card 225 when the payment card 225 is swiped through it. The payment card data captured by the card reader can include the cardholder's name, credit card number, expiration date, card verification value and the like. The POS terminal 215 transmits the captured payment card data to the payment service system 108 as part of transaction authorization process. Once the transaction is approved, the customer can be presented a user interface 230 for the customer to provide an email address 235 and/or a phone number 240 where the receipt can be delivered. In some embodiments, the customer can be provided an option 245 to decline the receipt. The user-provided email address and/or phone number is also transmitted to the payment service system 108 for receipt delivery or other reasons (e.g., to subscribe to promotions or offers).

The payment service system 108 captures both the payment card data from the swiping transaction and the email address and/or phone number provided by the user at the POS terminal 215 and provides the information to the one swipe registration system 109. The one swipe registration system 109 uses the information captured at the POS terminal 215 to automatically register a new customer account on behalf of the customer. In some embodiments, the new customer account can be used in services or applications provided by the payment service system. For example, in one embodiment, the payment service system 108 provides a service for sending and requesting money with email. The customer can start using this service by using the email address and/or phone number and a card verification code associated with a payment card used in the swiping transaction, without having to sign up or register for a customer account for the service. By way of another example, the payment service system 108 can provide an electronic wallet service in another embodiment. The customer can download and install the electronic wallet application and access his or her wallet account that is already linked to one or more payment cards used in one or more swiping transactions by providing the email address and/or phone number and a card verification value of at least one of the payment cards.

In some embodiments, instead of entering the email address or phone number on the user interface provided by the POS terminal 215, a user interface provided by a mobile payment application on the mobile device of the customer involved in the swiping transaction can be utilized. For example, if the customer has a mobile payment application associated with the payment service system installed on his or her mobile device, the customer can open the application and enter on a user interface provided by the mobile application an email address or a phone number and a card verification value associated with the payment card used in the swiping transaction. The mobile application can transmit these two pieces of information to the one swipe registration system 109 to register an account for the customer. In some embodiments, if the customer has a mobile payment application installed on the mobile device, the POS terminal 215 or the payment service system 108 can communicate with the customer's mobile device (e.g., via push notification, near-field communication, bluetooth communication or other short range communication technology) to request the customer to submit an email address or phone number via the mobile device to the payment service system 108.

In some embodiments, when the customer submits the email address or phone number via a user interface of the mobile application on the mobile device, an identifier for the mobile application (e.g., App ID or bundle ID) can be transmitted along with the email address or phone number, the card verification value, etc., to the one swipe registration technology. In response, the one swipe registration technology can associate the identifier for the mobile application and can be associated with the account for the customer by the one swipe registration technology. Once the association between the payment card, the email address or phone number and the identifier for the mobile application is verified, the one swipe registration technology can allow any one of the email address/phone number, or the identifier for the mobile application, along with the card verification value for the payment card, to be used in lieu of the payment card in a transaction supported by the payment service system. For example, if the customer uses the mobile application, which can have an application identifier associated with the customer account to send money to a recipient, the customer need only enter the card verification value to process the transaction.

FIGS. 3A-3D are example transaction flows in a service or application for sending and requesting money via email provided by the payment service system 108. While the transaction flows described herein utilize an email address as a communication identifier for sending and receiving money, other communication identifiers such as a phone number, a device identifier, an application identifier, or the like can also be utilized for sending and receiving money to and from the customer.

Figure 3A:
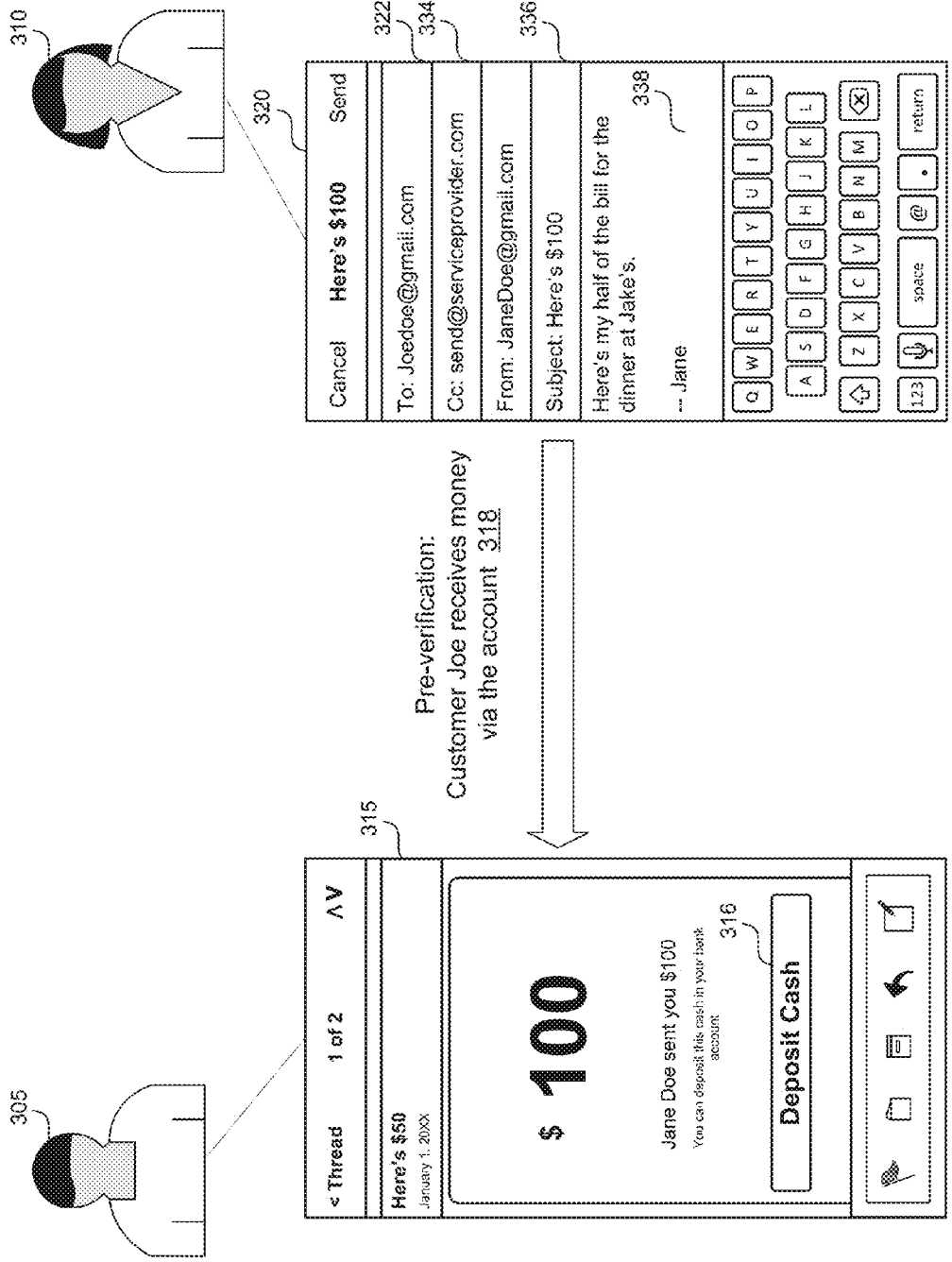
FIG. 3A illustrates use of the customer account prior to verification for receiving funds, in accordance with some embodiments of the one-swipe technology.

Suppose that customer who swiped a payment card ending in 9010 and who provided his email address "Joedoe@gmail.com" in the example of FIG. 2, is customer 305 named "Joe" of FIG. 3A. The one swipe registration system 109 registered a customer account for customer Joe when the swiping transaction occurred, temporarily associating the payment card ending in 9010 used by customer Joe in the swiping transaction to the email address "Joedoe@gmail.com."

As shown by the pre-verification transaction flow 318, before customer Joe's account has been verified, customer Joe receives an email indicating that money sent by customer 310, named "Jane," is available for deposit to a bank account associated with the payment card. Customer Jane composes an email 320 for sending money by including customer Joe's email address in the "To" field 322, the service provider's address in the "Cc" field 334 and a "Subject" field 336 that includes the amount of money to be sent. The email 320 can also include a message 338. The email 315 that is sent by the service provider and received by customer Joe identifies the amount of money and the name of the person sending the money. The email 315 also includes a button or a link 316 that can be selected to initiate deposit of the money to the bank account associated with customer Joe's payment card. In this manner, customer Joe is able to deposit funds received from any customer to his bank account without having to sign up or register for an account with the payment service system 108.

In this example embodiment, an unverified customer account has partial authorization or privileges since the unverified customer account can be used to receive money sent by other customers but cannot be used to send money to other customers. Receiving money can occur securely even if the customer account is unverified since only the owner of the email address can receive the email notification and initiate the deposit. In some embodiments, for added security, the customer receiving the email notification may be requested to provide a card verification value associated with the payment card (and/or the last four digits of the payment card) to initiate the deposit. The extra step ensures that the customer receiving the email is in possession of the payment card. In some embodiments, when the same email address is associated with more than one payment card, the one swipe registration technology can request the user to provide the card verification value or a portion of the payment card number which can be used to identify the payment card to which the deposit should be made.

Figure 3B:
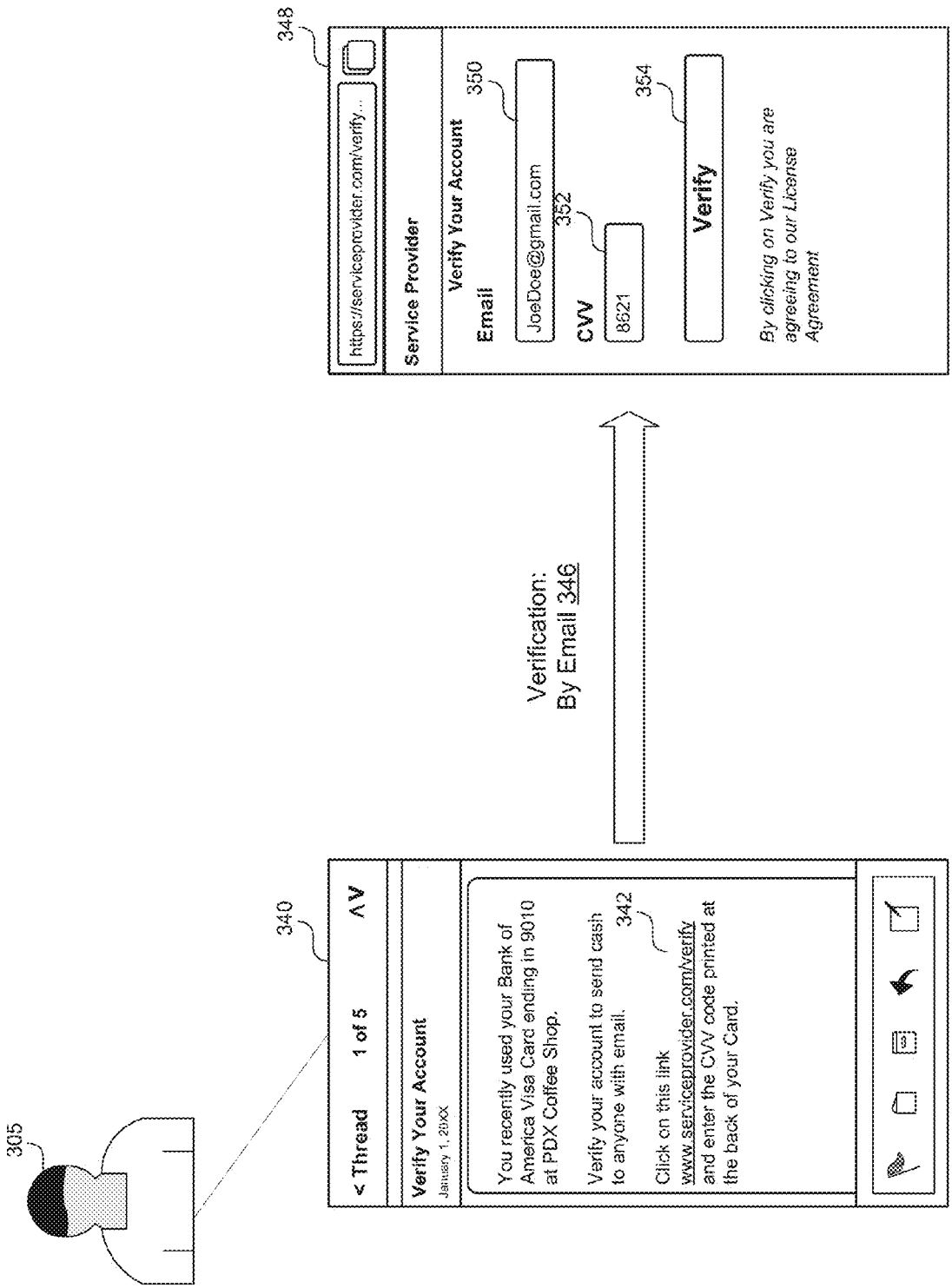
FIG. 3B illustrates an example verification of the customer account, in accordance with some embodiments of the one-swipe registration technology.

FIG. 3B illustrates an example transaction flow 346 for verifying the customer account by email from the one swipe registration technology in some embodiments. The one swipe registration system 109 generates and sends a verification request (e.g., email 340) requesting customer Joe (customer 305) to verify the account created for the customer. The verification request can be triggered by the swiping transaction and submission of the email address. The verification request can identify the payment card (e.g., the card type and/or the last four digits of the payment card). The verification request can also include a link such as link 342 that links to a webpage or a mobile application (if installed or a link to download and install the mobile application) where the customer can complete the account verification process. If, for example, the customer has no application installed on his device, the webpage 348 may be opened on the browser on the customer's mobile device. The webpage can include a text box 350 for entering the email address (or phone number), which can be auto-populated or pre-filled. The web page can also include a text box 352 for entering the card verification value associated with the payment card. The customer can select the verify button 354 to complete the verification process.

In some embodiments, when the same email address is used in swiping transactions involving different payment cards, the verification request can include at least one hint for resolving the identity of the payment card such that the customer can submit the correct card verification value. The hint can include, for example, the payment card type, last x number of digits of the payment card identifier, expiration date, payment card name, or a combination thereof (e.g., Visa 1091, Bank of America Visa Card).

Figure 3C:
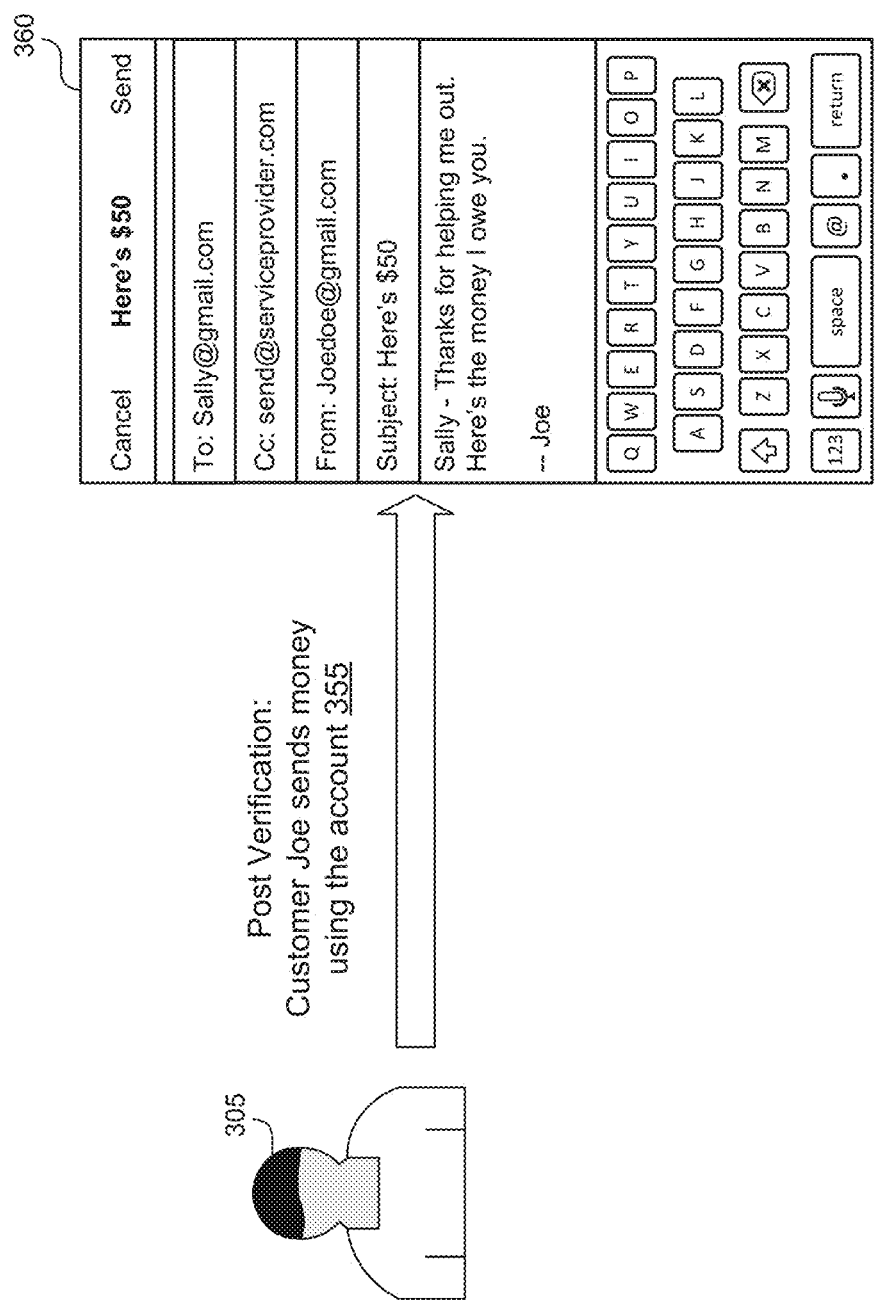
FIG. 3C illustrates an example use of the customer account post verification to send funds, in accordance with some embodiments of the one swipe registration technology.

FIG. 3C illustrates an example transaction flow 355 for using the customer account post verification to send funds to another customer in some embodiments. As illustrated, following account verification, customer Joe (customer 305) can send an email 360 to another customer Sally to send money in the amount of $50.00. Since customer Joe's account is already verified, when customer Sally initiates deposit of the money, the amount of $50.00 is withdrawn from customer Joe's bank account associated with the payment card.

Figure 3D:
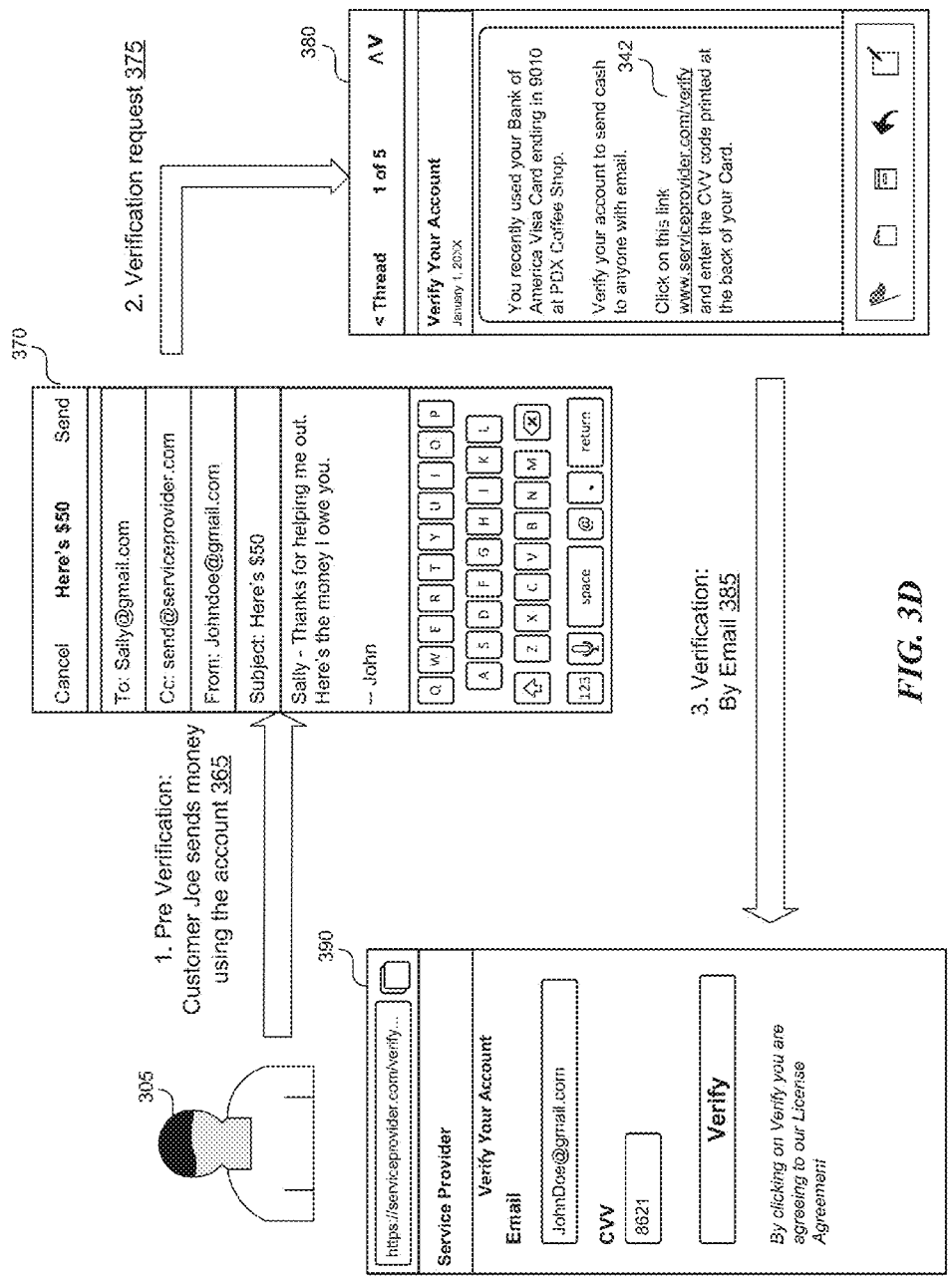
FIG. 3D illustrates an example verification of the customer account initiated by the customer, in accordance with some embodiments of the one swipe registration technology.

FIG. 3D illustrates example transaction flows for verifying the customer account in response to an email from the customer in some embodiments. As shown by the pre-verification transaction flow 365, customer Joe (customer 305) sends money via an email 370 from his email address to customer Sally's email address. Since customer Joe's account in this example is unverified, as shown by transaction flow 375, the one swipe registration technology sends an email 380 including a link 342 or other instructions to verify the customer account. As shown by transaction flow 385, when customer Joe selects the link 342, a webpage 390 (or a user interface of an application if installed) is loaded on the browser. Customer Joe enters the card verification value associated with the payment card to verify the account. Once the account is verified, the payment service system 109 processes the money transfer request by notifying customer Sally.

Figure 4A:
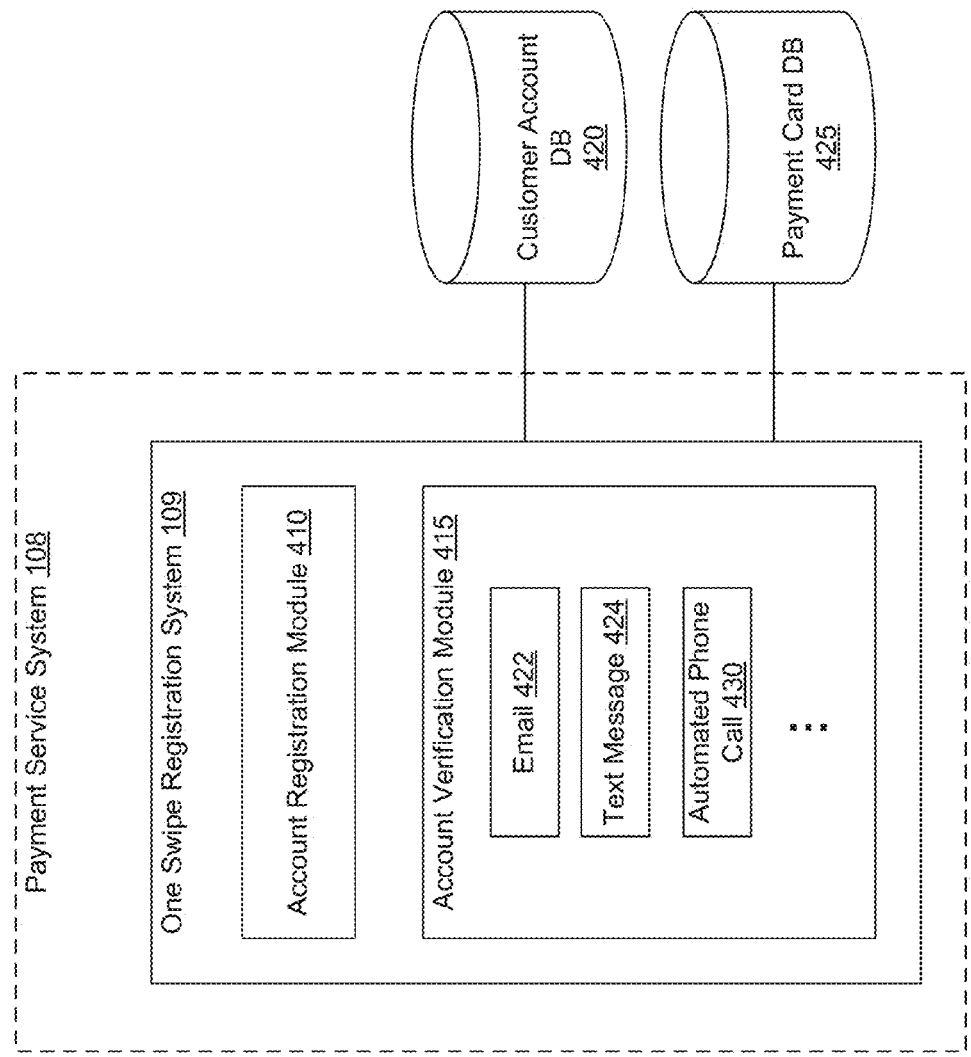
FIG. 4A illustrates an example of components of the one swipe registration system in accordance with some embodiments of the one swipe registration technology.

FIG. 4A illustrates an example of components of the one swipe registration technology in some embodiments. The one swipe registration system 109 can be a component or sub-system of the payment service system 108. Alternately, the one swipe registration system 109 can be implemented on a separate computing system (e.g., on a separate server or servers). The one swipe registration technology can include an account registration module 410 and an account verification module 415, among others. The account registration module 410 is triggered whenever a swiping transaction occurs at a POS terminal. The account registration module 410 checks one or more database tables such as the customer account database table 420 and the payment card database table 425 to determine whether a new customer account should be registered on behalf of the customer associated with the swiping transaction. For example, if a customer account associated with the email address and the payment card information already exists in the database tables, a new customer account will not be created. If, for example, the payment card that is stored in association with the email address in the database table 425 is different from the payment card used in the swiping transaction, then the account registration module 410 can create a new payment card record associating the payment card used in the swiping transaction with the email address in the payment card database table 425. In this manner, a customer account can have one email address associated with multiple payment cards.

FIG. 4B illustrates example fields of the customer account database table 420 and the payment card database table 425 from FIG. 4A. The customer account database table 420 can include various fields of information such as, but not limited to: customer ID1 (e.g., email address), customer ID2 (e.g., phone number), first name, last name, and/or the like. The payment card database table 425 can include various fields of information such as, but not limited to: customer ID1 or customer ID2 or a combination thereof, payment card identifier, issuer, expiration date, billing address, verification status, and/or the like.

The account verification module 415 can verify customer accounts created on behalf of customers by various methods described with reference to FIGS. 3B and 3D. In other words, the account verification module 415 can be configured to send a verification request via an email 422, a text message 424, an automated phone call 430 or any other suitable communication channel to request a customer to verify his or her account by providing the card verification value or other information corresponding to a payment card used in a swiping transaction by the customer. In one embodiment, the account verification module 415 can verify the card verification value or other information corresponding to the payment card provided by the customer based on information stored in the payment card database table 425 and/or by sending an authorization request to the card payment network 116. For example, the card payment network 116 can return a match or a mismatch response depending on whether the card verification value submitted by the customer matches with the card verification value associated with the payment card. If the response is a match, then the customer account's status is changed to verified. Otherwise, the customer account's status remains unverified.

Figure 5A:
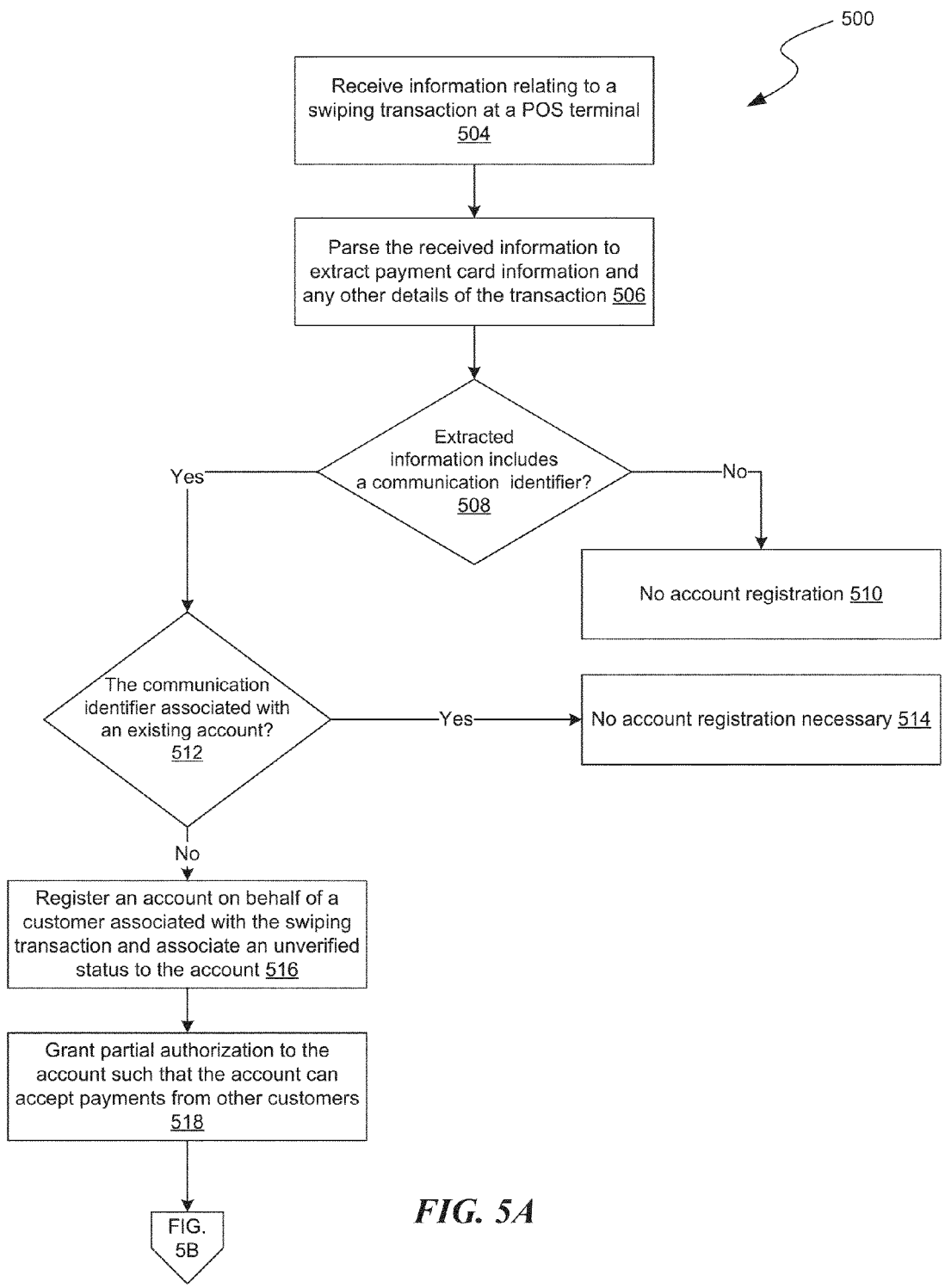
FIG. 5A illustrates an example method of automatically registering a customer account, in accordance with some embodiments of the one swipe registration technology.

FIG. 5A illustrates an example method 500 of registering an account on behalf of a customer triggered by a swipe of a payment card at a POS terminal in some embodiments of the one swipe registration technology. The one swipe registration technology receives information relating to a swiping transaction at a POS terminal at block 504. At block 506, the one swipe registration technology parses the received information to extract payment card information and any other details of the swiping transaction. For example, the one swipe registration technology can extract payment card information such as an identifier of the payment card, expiration date, card verification value on the payment card, billing address (e.g., zip code), or the like. The one swipe registration technology can also extract any information entered by the user (e.g., email address, phone number). In some embodiments, the email address or phone number can be received in a transmission separate from the payment card information. In some instances, a communication identifier which can include an email address or a phone number may not be provided for the purpose of registering a customer account, but for other purposes such as receipt delivery. In other instances, the communication identifier may be provided for various purposes including registering a customer account.

At decision block 508, the one swipe registration technology examines the extracted information to determine if the extracted information includes a communication identifier. If no communication identifier was received, the account registration process can be terminated at block 510 Conversely, if a communication identifier was received and the communication identifier is determined to be associated with an existing account at decision block 512, account registration is not necessary and the process can be terminated at block 514. If, however, the communication identifier is not associated with an existing account as determined at decision block 512, the one swipe registration technology registers an account on behalf of the customer associated with the swiping transaction and assigns an unverified status to the association between the communication identifier and the payment card at block 516. At block 518 the one swipe registration technology grants a partial authorization to the account such that the account can be used to accept payments from other customers, even with the unverified status.

In some embodiments, if the communication identifier is associated with an existing account that is associated with a payment card different from the payment card involved in the swiping transaction, the one swipe registration technology can update the existing account so that the new payment card can also be associated with the existing account along with the old payment card.

Figure 5B:
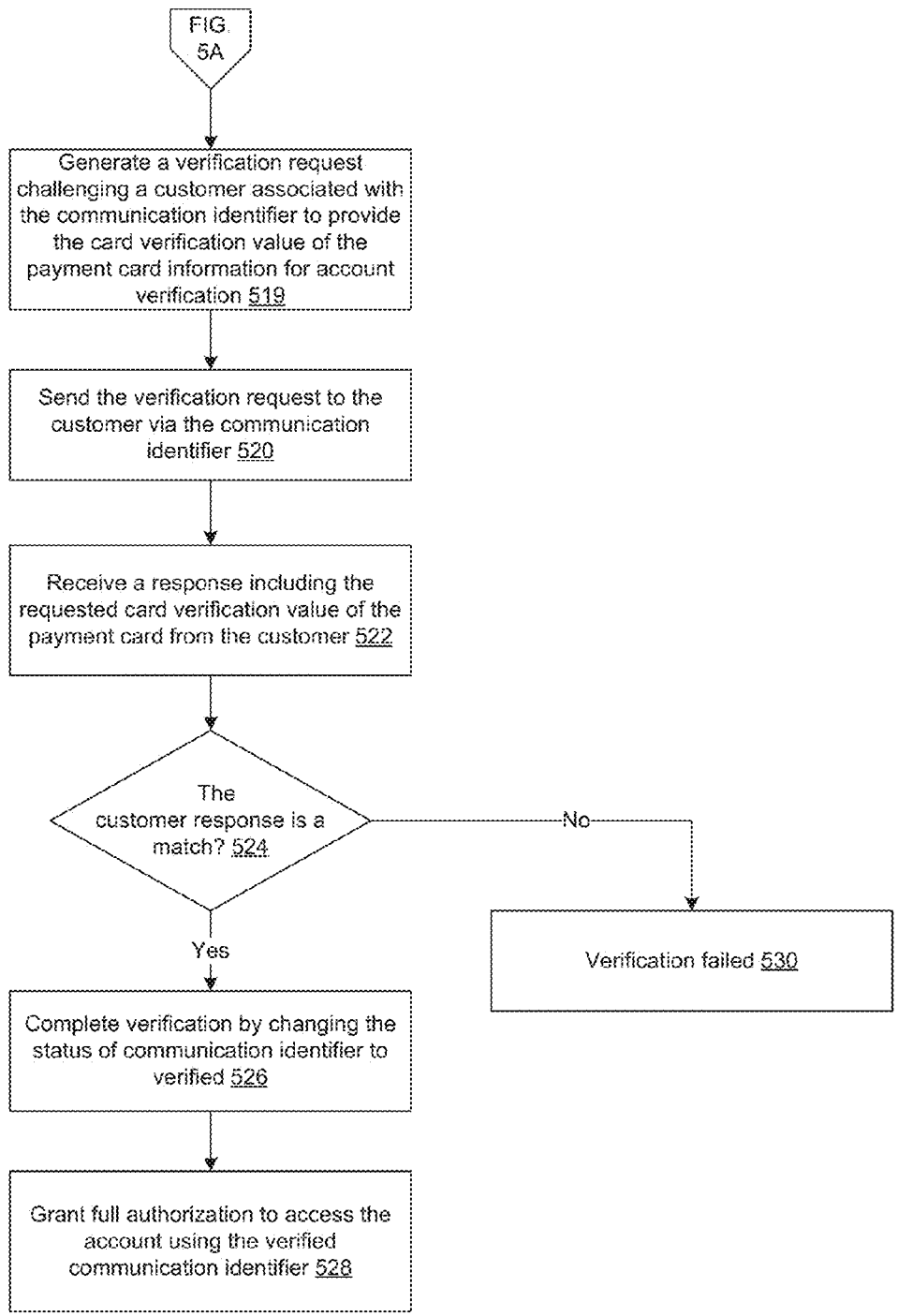
FIG. 5B illustrates an example method of verifying the customer account, in accordance with some embodiments of the one swipe registration technology.

FIG. 5B illustrates an example method of verifying the customer account by sending a verification request to the communication identifier to request the customer to provide a card verification value associated with the payment card in some embodiments of the one swipe registration technology. Continuing from block 514 in FIG. 5A, the one swipe registration technology generates a verification request challenging the customer associated with the communication identifier to provide the card verification value of the payment card for account verification at block 519 At block 520, the one swipe registration technology sends the verification request to the customer via the communication identifier. For example, if communication identifier is an email address, the one swipe registration technology sends an email verification request to the customer. Similarly, if the communication identifier is a phone number, the one swipe registration technology can send a text message based verification request or an automated phone call based verification request to the customer.

In some embodiments, when a customer account has multiple payment cards associated with it, the one swipe registration technology can include at least one hint for resolving the identity of the payment card or payment cards to which the verification request is directed. The hint can include, for example, the payment card type, last x number of digits of the payment card identifier, expiration date, payment card name, or a combination thereof (e.g., Visa 1091, Bank of America Visa Card).

In response to receiving the verification request, the customer performs the requested verification action. Performing the requested verification action can include clicking on a link in an email and providing the card verification value associated with the payment card on a webpage or on a user interface of an application, responding to a text message with the card verification value or providing the card verification value during the automatic phone call, for example. At block 522, the one swipe registration technology receives the response including the card verification value from the customer.

At decision block 524, the one swipe registration technology determines if the customer response is a match. The determination can include sending an authorization request to the card payment network. The authorization request can be for a $0.00 charge, a $1.00 or some other small charge on the payment card which is later reversed. The card payment network returns a match response if the card verification value corresponds to the payment card. Otherwise, a mismatch response is returned. If the response is a mismatch, the verification process is terminated at block 530. At this point, the customer has limited or no authorization for accessing the customer account using the communication identifier.

If the customer response is a match, the one swipe registration technology completes verification by changing the status of the communication identifier to verified at block 526. At block 528, the one swipe registration technology grants full authorization to the customer access the account using the verified communication identifier. Once the full authorization is granted, the customer can use the communication identifier to send money to other customers as well as receive money from other customers.

Figure 5C:
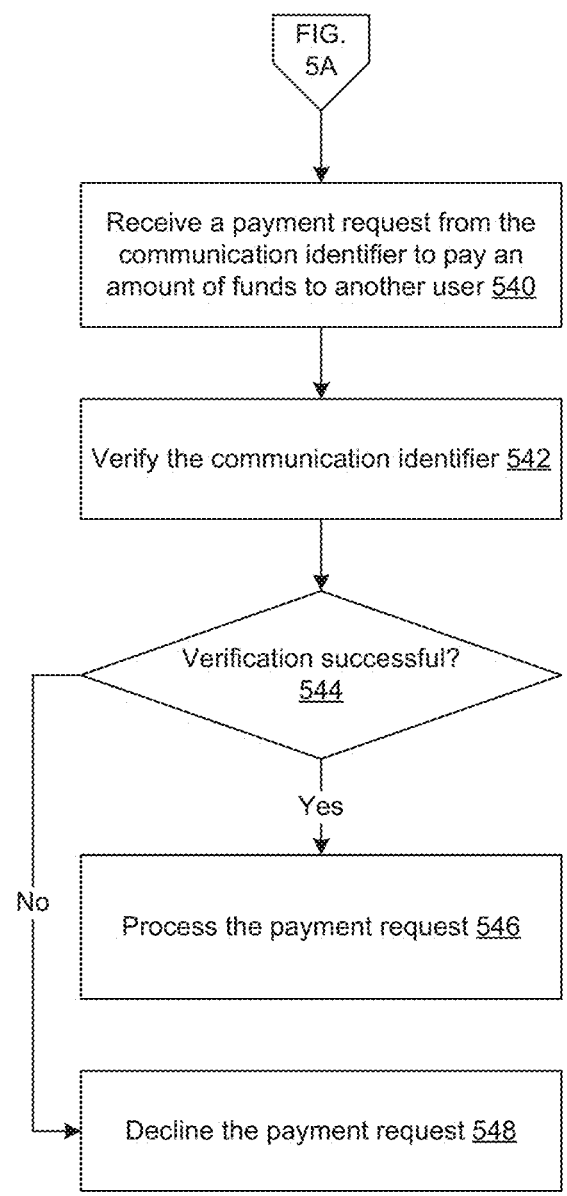
FIG. 5C illustrates an example method of verifying the customer account in response to receiving a payment request, in accordance with some embodiments of the one swipe registration technology.

FIG. 5C illustrates an example method of verifying the communication identifier associated with the customer account in response to receiving a payment request from the customer in some embodiments of the one swipe registration technology.

At block 540, the one swipe registration technology receives a payment request from the communication identifier to pay an amount of funds to another customer. The payment request can be an email from the customer's email address associated with the customer account. The email includes the recipient's email address in the "To" field, an email address of the service provider in the "Cc" field and a subject line that includes the amount of funds to be sent to the recipient. At block 542, the one swipe registration technology verifies the communication identifier. As described with respect to FIG. 5B, the one swipe registration technology can verify the communication identifier by sending a verification request to the communication identifier. The verification request can be an email that identifies a portion of the payment card identifier (e.g., last 4 digits of the payment card and/or payment card type) and includes a link that opens a webpage or an application (if installed) where the customer can enter the card verification value of the payment card to verify that the owner of the email address is also the owner of the payment card. If the account verification is successful at decision block 544, the one swipe registration technology processes the payment request at block 546 such that the amount of funds specified in the payment request can be withdrawn from a bank account associated with the payment card for deposit to a bank account associated with the recipient's email address. Conversely, if the account verification is not successful, the one swipe registration technology declines or rejects the payment request at block 548.

Figure 6:
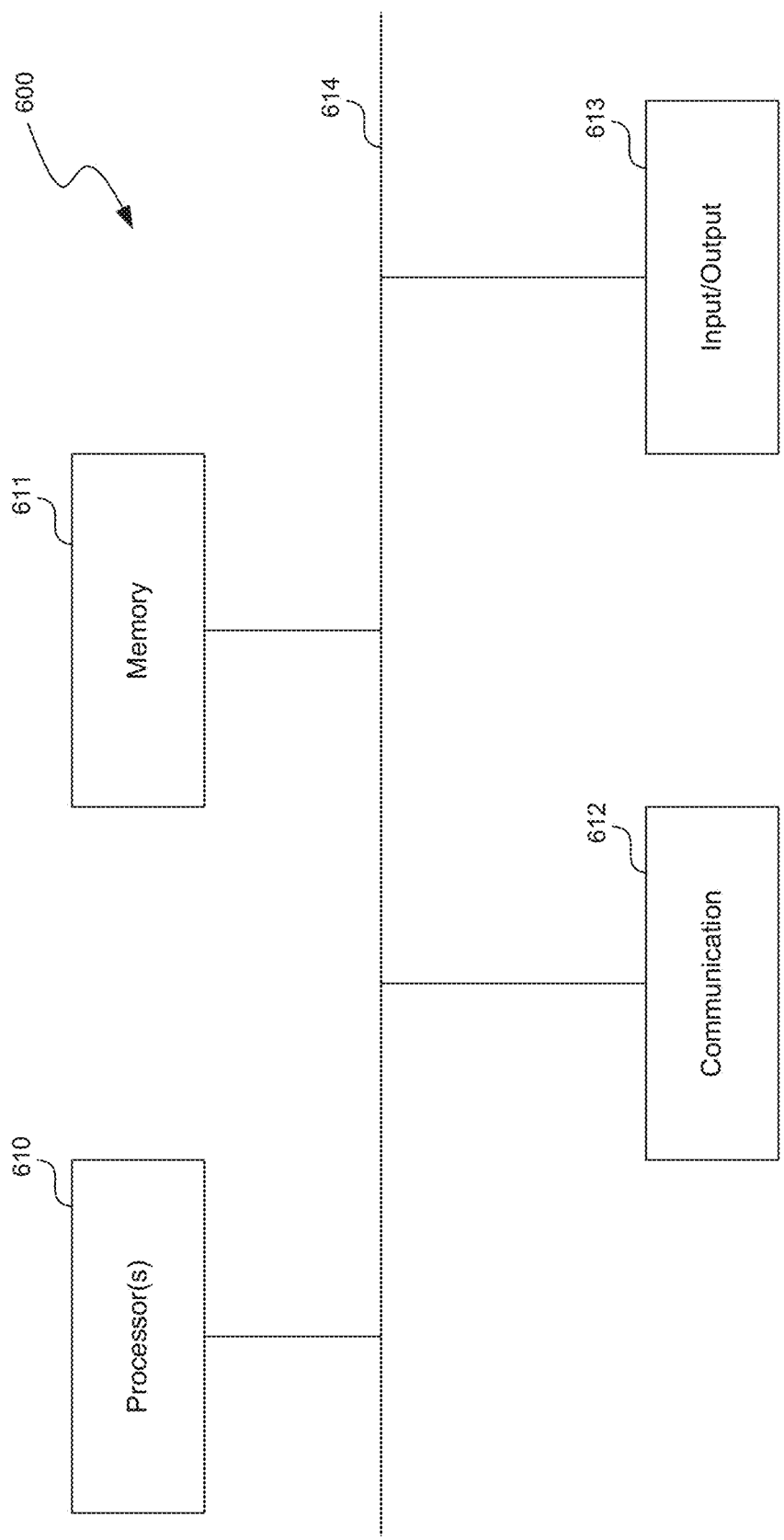
FIG. 6 is a high-level block diagram showing a computer system in which at least some operations related to the disclosed technology can be implemented.

FIG. 6 is a high-level block diagram showing an example of a processing device 600 that can represent any of the devices described above, such as the mobile device 102, POS terminal 104, payment processor system 114, 116 or 118, the payment service system 108 and the one swipe registration system 109. As noted above, any of these systems may include two or more processing devices such as represented in FIG. 6, which may be coupled to each other via a network or multiple networks.

In the illustrated embodiment, the processing system 600 includes one or more processors 610, memory 611, a communication device 612, and one or more input/output (I/O) devices 613, all coupled to each other through an interconnect 614. The interconnect 614 may be or include one or more conductive traces, buses, point-to-point connections, controllers, adapters and/or other conventional connection devices.

The processor(s) 610 may be or include, for example, one or more general-purpose programmable microprocessors, microcontrollers, application specific integrated circuits (ASICs), programmable gate arrays, or the like, or a combination of such devices. The processor(s) 610 control the overall operation of the processing device 800.

Memory 611 may be or include one or more physical storage devices, which may be in the form of random access memory (RAM), read-only memory (ROM) (which may be erasable and programmable), flash memory, miniature hard disk drive, or other suitable type of storage device, or a combination of such devices. Memory 611 may store data and instructions that configure the processor(s) 610 to execute operations in accordance with the techniques described above.

The communication device 612 may be or include, for example, an Ethernet adapter, cable modem, Wi-Fi adapter, cellular transceiver, Bluetooth transceiver, or the like, or a combination thereof. Depending on the specific nature and purpose of the processing device 600, the I/O devices 613 can include devices such as a display (which may be a touch screen display), audio speaker, keyboard, mouse or other pointing device, microphone, camera, etc.

Unless contrary to physical possibility, it is envisioned that (i) the methods/steps described above may be performed in any sequence and/or in any combination, and that (ii) the components of respective embodiments may be combined in any manner.

The techniques introduced above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.).

Note that any and all of the embodiments described above can be combined with each other, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method of automatically creating an account on behalf of a customer that enables the customer to transfer money, comprising:

receiving, at a payment service system, payment card information extracted by a point of sale (POS) terminal of a merchant from a payment card swiped by the customer at the POS terminal,
  wherein the payment card is used in a financial transaction between the customer and the merchant,
  wherein the payment card information provides an electronic access to the customer's financial account at a financial institution to deposit or withdraw funds;
receiving, at the payment service system, an email address input by the customer as a part of the financial transaction for the purpose of electronic receipt delivery to the customer,
  wherein the email address is received through a user interface presented at the POS terminal of the merchant;
automatically creating, by the payment service system, an account for the customer at the payment service system by linking, in a storage area, the payment card information with the email address, wherein the account is configured to be used by the customer to transfer money to other individuals;
verifying, by the payment service system, the account using a communication channel associated with the customer, wherein the account is verified to determine that the customer is the owner of the email address and has possession of the payment card, wherein the verifying includes:
  transmitting, by the payment service system, a verification request to the email address, wherein the verification request includes a link to a network-accessible interface configured for the customer to input a card verification value;
  receiving, by the payment service system, a response to the verification request, wherein the response includes a card verification value entered by the customer at the network-accessible interface; and
  in response to determining, by the payment service system, that the card verification value in the response matches a card verification value previously associated with the payment card linked to the account:
    assigning, by the payment service system, the account a verified status, wherein the verified status fully authorizes the account for use by the customer to transfer money to other individuals using the payment service system.

2. The method of claim 1, further comprising:
prior to verifying the account, allowing money transferred by another customer to the customer using the email address of the customer to be deposited into the customer's financial account associated with the payment card.

3. The method of claim 1, further comprising:
receiving, by the payment service system, an email message from the email address of the customer to transfer an amount of money to a recipient, the email message including a header that specifies a recipient email address associated with the recipient and the service email address associated with the payment service system and a body, wherein the amount of money to be transferred is specified in the body or a subject field in the header;
determining, by the payment service system, that the email address of the customer is linked to the customer's financial account and the account has been assigned the verified status; and initiating, by the payment service system, a transfer of the amount of money specified in the email message from the customer's financial account to a financial account associated with the recipient.

4. The method of claim 1, wherein a user interface is displayed on the mobile device in response to a notification pushed to the mobile device from the payment service system to prompt the customer to provide the email address.

5. A method of creating an account with a payment service system on behalf of a customer that enables money to be transferred using a communication identifier and a payment card tied to the communication identifier, comprising:
receiving, at the payment service system, first payment card data extracted by a point of sale terminal from a first payment card swiped by a customer at the point of sale terminal, wherein the payment card is used in a financial transaction,
    wherein the point of sale terminal is operated by a merchant, and wherein the first payment card data is received electronically from the point of sale terminal;
transmitting, by the payment service system to the point of sale terminal, an instruction to instruct the customer's mobile device to generate a push notification configured to prompt the customer to enter a communication identifier;
receiving, at the payment service system, the communication identifier input by the customer in response to the push notification;
automatically creating the account for the customer at the payment service system by linking the communication identifier with the first payment card data received as part of the financial transaction, wherein the account is configured to be used by the customer to transfer money to other individuals;
transmitting, by the payment service system, a verification request through a communication channel associated with the communication identifier, wherein the verification request includes a link to a network-accessible interface configured for the customer to input a card verification value;
receiving, by the payment service system, a response to the verification request, wherein the response includes a card verification value entered by the customer at the network-accessible interface;
in response to determining by the payment service system, that the card verification value in response matches a card verification value previously associated with the payment card linked to the account:
    assigning, by the payment service system, the account a verified status, wherein the verified status authorizes the customer to transfer money to other individuals using the communication identifier.

6. The method of claim 5, wherein the communication identifier is provided by the customer via a user interface presented at the point of sale system operated by the merchant.

7. The method of claim 5, wherein the verification request causes a mobile application on the mobile device to present a user interface for the customer to input the card verification value.

8. The method of claim 5, further comprising:
receiving, by the payment service application, an identifier for a mobile application or the mobile device along with the card verification value; and
in response, associating, by the payment service application, the identifier for the mobile application or the mobile device with the account for the customer.

9. The method of claim 8, further comprising:
using the card verification value for the first payment card received from the customer to verify that the customer associated with the first payment card is also associated with the communication identifier and the identifier for the mobile application or the mobile device.

10. The method of claim 9, wherein upon verifying that the customer associated with the first payment card is also associated with the communication identifier and the identifier for the mobile application or the mobile device, allowing any one of the communication identifier or the identifier for the mobile application or the mobile device to be used in lieu of the first payment card in a transaction involving the payment service system.

11. The method of claim 5, wherein the communication identifier includes at least one of an email address and a phone number.

12. The method of claim 5, further comprising:
receiving, by the payment service system, a transaction request from the communication identifier to send funds to a recipient, wherein the transaction request excludes any information associated with the first payment card; and
in response to receiving the transaction request, sending a verification request to the communication identifier to verify that the customer associated with the first payment card is also associated with the communication identifier.

13. The method of claim 12, further comprising:
prior to verifying that the customer associated with the first payment card is also associated with the communication identifier, allowing a deposit of funds sent by another customer to the communication identifier into a bank account associated with the first payment card.

14. The method of claim 12, further comprising:
after verifying that the customer associated with the first payment card is also associated with the communication identifier, processing the transaction request by transferring a specified amount of funds corresponding to the transaction request from a bank account associated with the first payment card to a bank account associated with the recipient.

15. The method of claim 5, further comprising:
receiving, at the payment service system, payment card data extracted by a second point of sale system from a second payment card used in a swiping transaction;
receiving, at the payment service system, the communication identifier as part of the swiping transaction;
determining that the communication identifier is associated with the account with the payment service system; and
in response, automatically updating the account to associate the second payment card with the communication identifier.

16. The method of claim 15, further comprising:
verifying that the customer associated with the account has ownership of the second payment card by:
    sending a verification request to the communication identifier, wherein the verification request includes at least one hint for resolving the identity of the second payment card;
    receiving a response to the verification request; and
    determining whether the response matches a card verification value for the second payment card.

17. A payment service system, comprising:
a processor;
a storage area; and
a networking interface coupled to the processor,
wherein the processor is programmed to execute operations including:
   receive a payment card information extracted by a point of sale device of a merchant when a customer swipes the payment card at the point of sale device for a financial transaction between the customer and the merchant;
   receive a communication identifier from the point of sale device or from a computing device associated with the customer via a communication channel, wherein the communication identifier is input by customer as part of the transaction;
create an account on behalf of the customer by linking, in the storage area, the communication identifier with the payment card, wherein the account is configured to be used by the customer to transfer money to other individuals;
   transmit a verification request through the communication channel associated with the communication identifier, wherein the verification request includes a link to a network-accessible interface configured for the customer to input a card verification value or a portion of an account number printed on the payment card to verify that the customer is the owner of the communication identifier and has possession of the payment card;
   receive a response to the verification request, wherein the response includes a card verification value or a portion of an account number printed on the payment card entered by the customer at the network-accessible interface; and
   in response to determining by the payment service system, that the card verification value or the portion of the account number in response matches a card verification value or the portion of the account number previously associated with the payment card linked to the account:
      assign the account a verified status that fully authorizes the account for use by the customer to transfer money to other individuals using the payment service system.

18. The system of claim 17, wherein the communication identifier is entered at the point of sale device.

19. The system of claim 17, further configured to:
receive an identifier for a mobile application installed on a mobile device associated with the customer, wherein the communication identifier is entered on a user interface of the mobile application on the mobile device; and
associate the identifier for the mobile application with the account to authorize the customer to access or use the account via the mobile application using the card verification value of the payment card.

* * * * *